Sept. 22, 1970      J. J. KLOVER      3,529,909
ROTARY ENGINE
Filed May 26, 1966      4 Sheets-Sheet 2
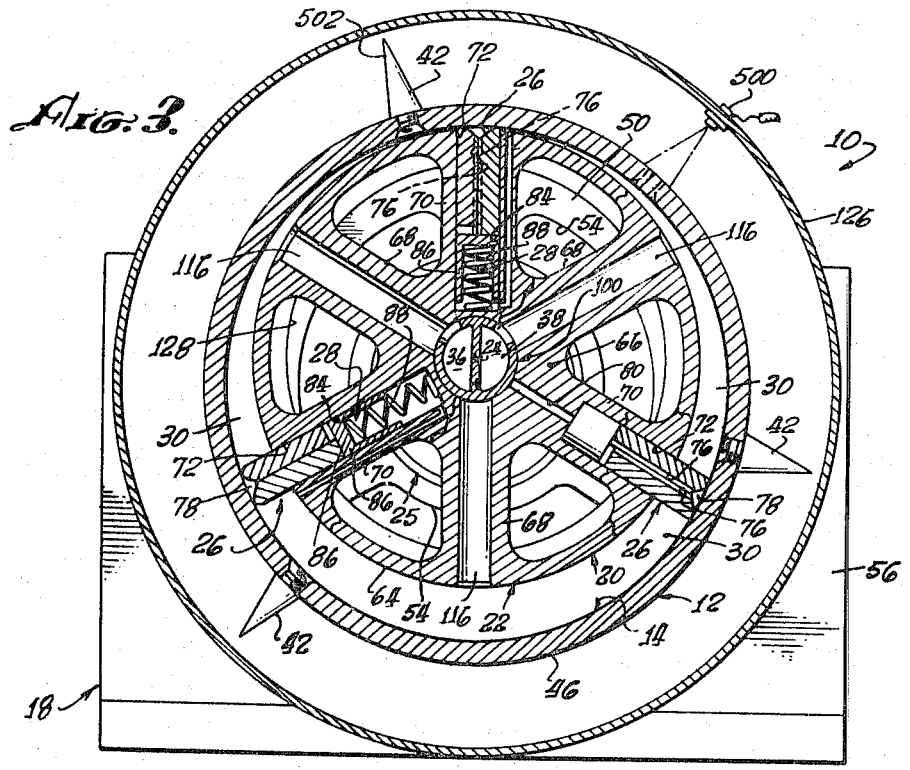
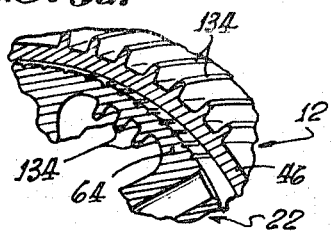
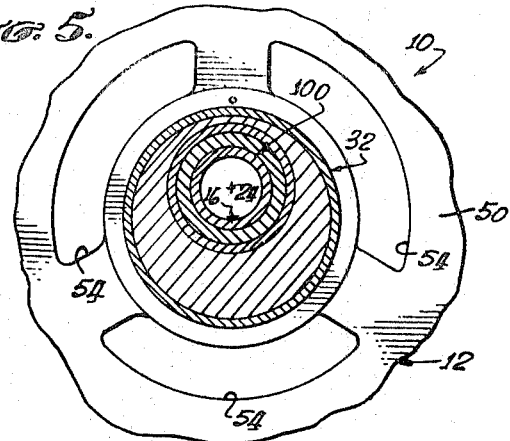
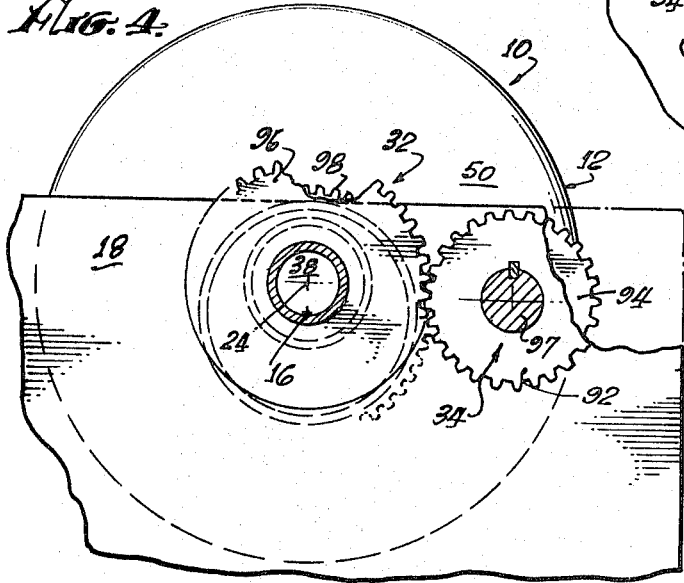
INVENTOR.
JOHN J. KLOVER,
By Richard C. Brown
ATTORNEY.

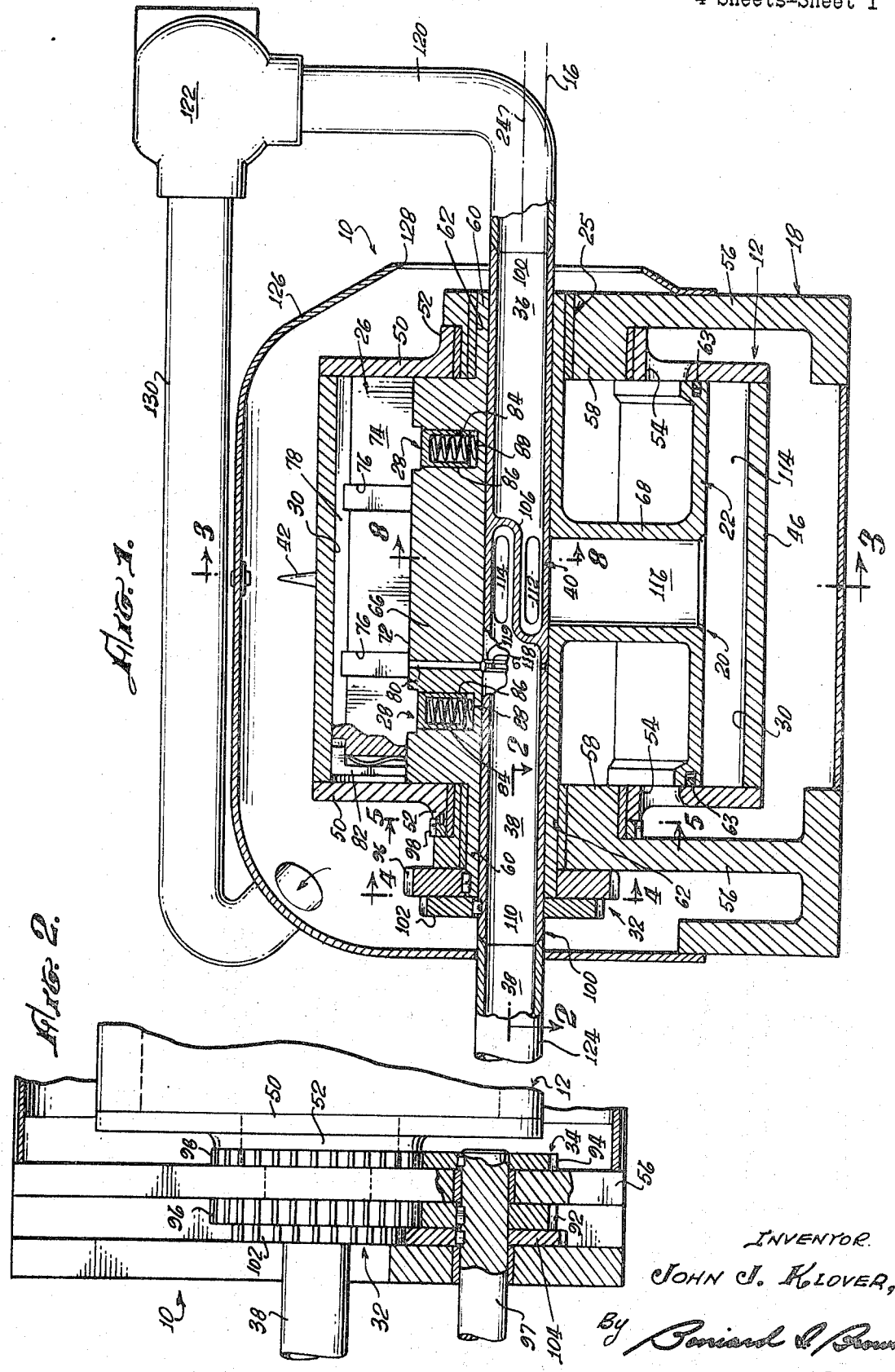

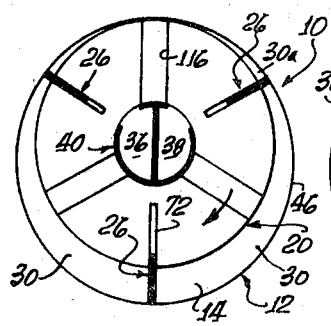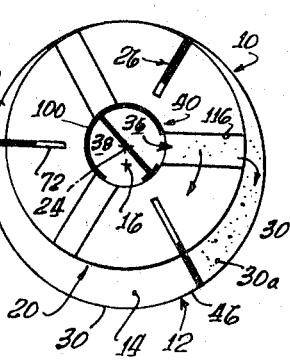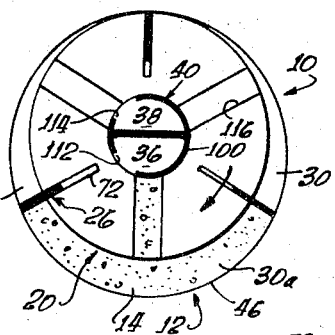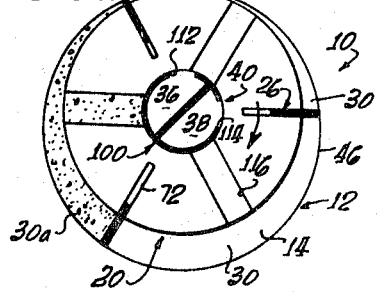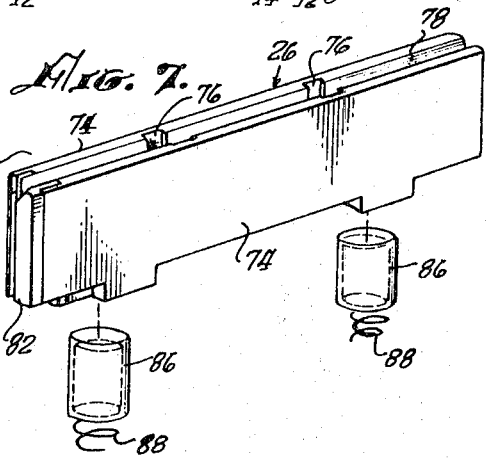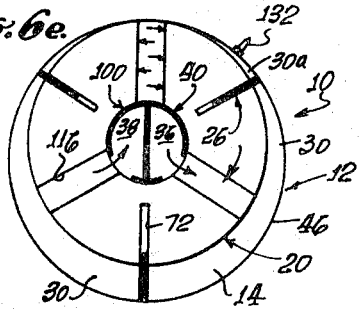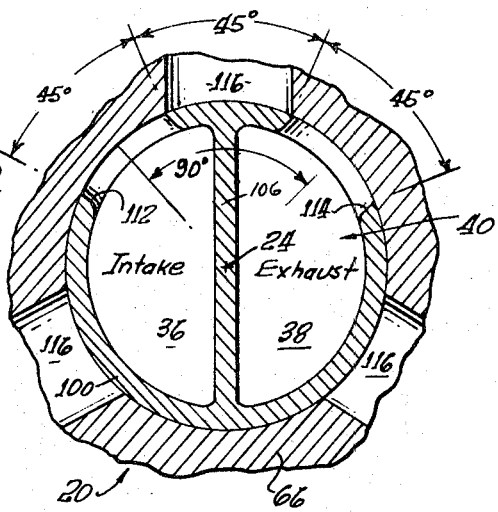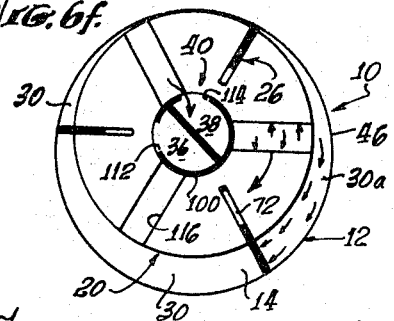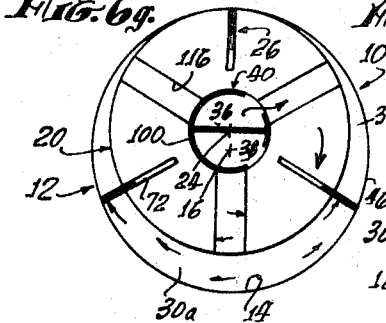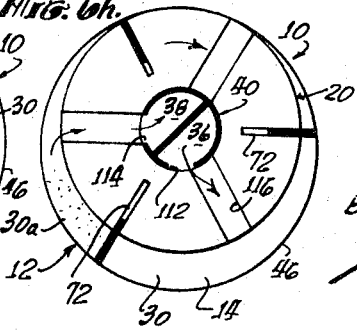

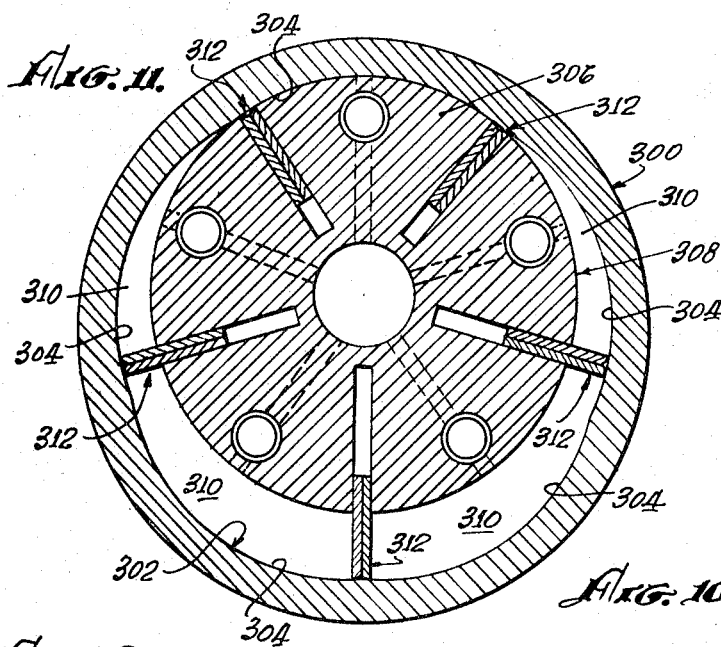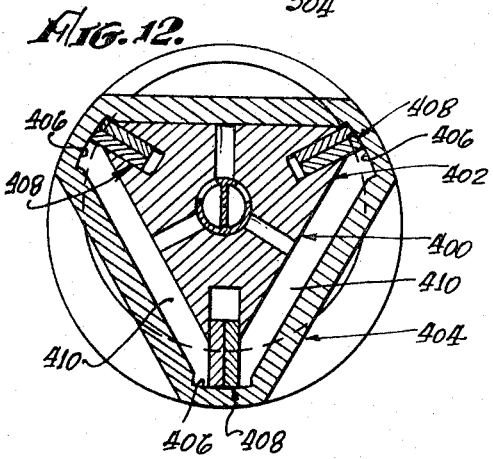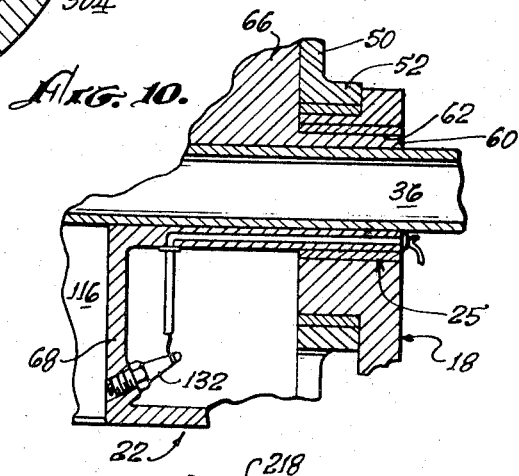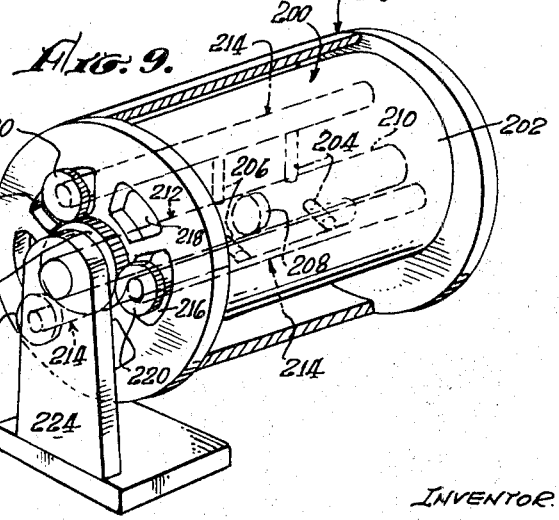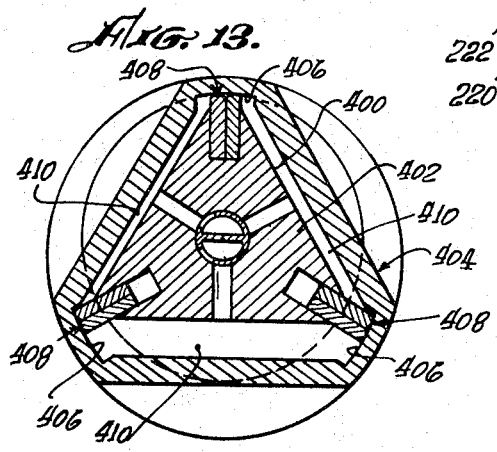

United States Patent Office 3,529,909
Patented Sept. 22, 1970

3,529,909
ROTARY ENGINE
John J. Klover, La Puente, Calif., assignor of thirty percent to Boniard I. Brown, West Covina, and forty-two percent to General Management Company, North Hollywood, Calif., a partnership
Filed May 26, 1966, Ser. No. 553,227
Int. Cl. F02b 53/04, 55/08; F01c 19/02
U.S. Cl. 418—91       17 Claims

ABSTRACT OF THE DISCLOSURE

A rotary chamber fluid pressure device which includes a housing defining an internal rotor chamber having a central axis, a housing support mounting said housing for rotation on said axis, a rotor within said chamber including a body having a central axis disposed in spaced, parallel relationship to the housing axis, a number of angularly spaced, radially movable vanes carried by the body and normally urged outwardly so as to be in fluid sealing relationship with the inner surfaces of the wall of the chamber. The rotor has intake and exhaust passages and valve means for admitting a working fluid into and for exhausting the working fluid from the chamber spaces through the intake and exhaust passages, respectively, in timed relation to the rotation of the rotor and housing. At the outer ends of the rotor vanes of means are provided for venting the region between the outer edge of each such rotor vane and the chamber wall to a reduced pressure region, preventing leakage of high pressure gas from one chamber to an adjacent chamber.

---

This invention relates generally to improvements in fluid pressurizing and fluid pressure actuated devices. More particularly, the invention relates to a novel rotary chamber pressure fluid device.

In it broader aspects, the invention provides a pressure fluid device of the kind which is characterized by a housing defining an internal rotor chamber, a rotor mounted within the chamber for turning on an axis eccentric to the chamber axis and having a number of angularly spaced radially movable vanes defining chamber spaces therebetween, and means for admitting a working fluid to and venting the working fluid from these chamber spaces in timed relation to rotation of the rotor. This basic structure of the present pressure fluid device will be recognized as that which is common to certain types of rotary pumps, rotary fluid pressure actuated motors, and rotary combustion engines. In this regard, it is significant to know at the outset that the improvement features of the invention may be utilized to great advantage in all three of the abovementioned types of pressure fluid devices—i.e., pumps, motors, and engines. However, the invention has primary utility in and will be disclosed in connection with its application to rotary internal combustion engines.

In pressure fluid devices of the kind under discussion, the volume of each chamber space alternately increases and decreases as the rotor turns due to the eccentricity of the rotor axis relative to the rotor chamber axis. This eccentric rotation of the rotor, of course, is permitted by the rotor vanes by virtue of the fact that these vanes are yieldably urged outwardly into fluid sealing relation to the wall of the rotor chamber, such that the vanes can move radially in and out of the rotor body to accommodate the continuous change in the radial spacing between any given point on the body and the chamber wall which occurs as the rotor turns. In a rotary pump of this kind, the valving is arranged to communicate each chamber space to a relatively low pressure fluid inlet during expansion of the respective chamber space and to a relatively high pressure fluid outlet during contraction of the chamber space, whereby the device exhibits a continuous pumping action. If the device is a fluid pressure actuated motor, the valving is arranged to communicate each chamber space to a relatively high pressure fluid inlet during expansion of the respective chamber space and through a relatively low pressure fluid outlet during contraction of the chamber space. In this case, action of the high pressure fluid within each chamber space on the unequal areas of the rotor vanes bounding the space create a net torque in one direction on the rotor which drives the latter in rotation. The working fluid may be a liquid, a gas from an external pressurized gas source, or a gas generated by an external combustion process. The operation of a rotary pressure fluid device, when used as an internal combustion engine, is essentially the same as in the case of the motor just discussed. In a rotary internal combustion engine, however, the high pressure working fluid is a gas which is generated directly within each chamber space by burning of a combustible fuel in the space. As noted earlier, while the present invention may be utilized to advantage in all of these types of rotary pressure fluid devices, the invention will be hereinafter discosed primarily in connection with an internal combustion engine.

The existing rotary pressure fluid devices of the kind under discussion, while satisfactory in many ways, possess certain deficiencies which this invention seeks to cure. Many of these deficiencies have long been troublesome to those working in the art and have prevented large scale use of some kinds of rotary pressure fluid devices, particularly rotary internal combustion engines. This is true even though such engines are known to be superior, from many stand-points, to reciprocating piston engines.

Many of the deficiencies of the prior art rotary pressure fluid devices result from the fact that the rotor and housing of such devices undergo relative rotation. Thus, in the majority, if not all, of the prior art devices, at least those of which I am aware, the housing is stationary and the eccentric rotor turns within and relative to the housing. This relative rotation of the rotor and housing have several disadvantages. For example, relative rotation of the rotor and housing results in sliding movement of the outer edges of the rotor vanes about or along the inner wall surfaces of the rotor chamber. Such sliding movement, of course, creates substantial wear and friction loss. Moreover, the rotor body and rotor chamber must be circular or generally circular in transverse cross-section. In most of the pior art devices, both the rotor body and rotor chamber are circular in cross-section, and expansion and contraction of the chamber spaces defined by the rotor vanes is accomplished by eccentric placement of the rotor in the chamber. In some cases, however, the rotor chambers are non-circular, such as generally elliptical. The prior art devices with such non-circular rotor chamber cross-sections, however, are costly to manufacture, give rise to excessive wear and friction loss between the rotor vanes and the wall surfaces of the rotor chamber, and are otherwise undesirable from the standpoint of manufacture, operation, and maintenance. It is obvious that the foregoing deficiencies of the prior art rotary pressure fluid devices are particularly serious in the case of rotary internal combustion engines.

One highly important aspect of the present invention is concerned with the fact that the housing, as well as the rotor, of the present improved pressure fluid device turns and, moreover, in unison with the rotor. This unified rotation of the rotor and housing occurs in such a way that the rotor and housing do not undergo relative rotation, at least any substatnial relative rotation. As a consequence, the invention achieves a great reduction in wear and friction loss, particularly between the rotor vanes and the walls of the rotor chamber. Since the rotor vanes are not required to slide along the walls of the rotor chamber, machining of the present pressure fluid device is greatly simplified and reduced in cost. Moreover, the housing and rotor may have a wide variety of configurations or geometries in transverse cross-section, including both circular and non-circular geometries. This permits much greater freedom in engine design. In this regard, for example, another highly important aspect of the invention is concerned with certain unique housing and rotor shapes or geometries which maximize the ratio between the maximum and minimum volumes of each chamber space defined by the rotor vanes. Obviously, this aspect or feature of the invention is particularly important and advantageous in rotary engines for the reason that it permits a maximum compression ratio in the engine and maximum efficiency and power output.

At this point, it is significant to note that in the present pressure fluid device, each chamber space is bounded by walls which rotate in unison. In effect, then, each chamber space rotates with the rotor. Hence, the use of the descriptive phrase "rotary chamber" in connection with the present device.

Another disadvantage of many prior art rotary pressure fluid devices of the kind under discussion is their dynamic unbalance. Such unbalance is particularly serious in rotary engines, of course, because of the relatively high speed. An important feature of the present device is its dynamic balance which is achieved by the unique arrangement of the rotor and housing.

Yet a further deficiency of the prior rotary pressure fluid devices, particularly rotary engines, is concerned with the problem of sealing the rotor vanes to the wall of the rotor chamber. It is obvious, of course, that if an efficient seal is not provided between the rotor vanes and the walls of the rotor chamber, leakage of working fluid can occur from one chamber space to an adjacent chamber space. In the case of rotary fluid pumps and motors, such fluid leakage merely reduces the efficiency of the devices. Leakage of working fluid between adjacent chamber spaces in a rotary engine also reduces engine efficiency. More serious, however, is the fact that leakage of hot combustion gas from a chamber space under combustion or under exhaust to an adjacent chamber space undergoing the compression or the intake portion of its cycle may cause preignition of the fuel in the adjacent chamber space. Such preignition produces a resisting torque on the rotor in opposition to the normal driving torque on the rotor, causes rough engine operation, reduces engine power and efficiency, and frequently causes damage.

According to the present invention, leakage of working fluid between adjacent chamber spaces of the fluid pressure device is prevented in a new and unique way. First, the rotor body and vanes are equipped with interfitting plungers and chambers and with passages which communicate these vane chambers to the chamber spaces defined between the vanes. Accordingly, when each chamber space is pressurized, high pressure fluid from the space acts to urge the adjacent rotor vanes outwardly into more intimate fluid sealing relation with the wall of the rotor chamber. This serves to maintain the vanes in intimate fluid sealing relation with the rotor chamber wall and, thereby, minimize the entrance of working fluid between the outer edges of the vanes and the chamber wall. Secondly, the rotor vanes are equipped with vent passages which one centrally through the outer chamber wall-engaging edges of the vanes and communicate to atmosphere. Accordingly, any working fluid which does enter between the outer edges of the vanes and the wall of the rotor chamber is effectively bled off to atmosphere and is thus prevented from entering the adjacent chamber space.

The improved rotary pressure fluid device of the invention has certain other unique features and advantages which will become evident as the description proceeds. Some of these additional features, for example, are a unique cooling arrangement for use in a rotary chamber engine according to the invention, a novel supper charging action for the engine, and unique valving which may be employed in all of the different forms of the present pressure fluid device.

Accordingly, it is a general object of the present invention to provide a novel rotary chamber pressure fluid device of the character described.

A more specific object of the invention is to provide a rotary chamber pressure fluid device which may comprise a rotary pump for pressurizing a working fluid, a rotary motor to be actuated by a pressurized working fluid, or a rotary combustion engine wherein the working fluid comprises hot combustion gas which may be generated by a combustion process taking place externally of the engine or directly within the chamber spaces of the engine.

A highly important object of the invention is to provide a rotary pressure fluid device of the character described wherein the rotor and rotor housing rotate in unison in such a way as to eliminate relative rotation between the rotor and housing and, thereby, wear and friction loss.

Yet another object of the invention is to provide a rotary pressure fluid device of the character described wherein the rotor and rotor chamber may have a variety of different shapes or geometries, both circular and non-circular, in transverse cross-section, thereby permitting substantially greater freedom in engine design.

A related object of the invention is to provide a rotary pressure fluid device according to the foregoing object wherein the rotor and rotor chamber have a unique non-circular cross-section which results in a substantial increase in the ratio between the maximum and minimum volumes of the chamber spaces defined by the rotor vanes.

Another related object of the invention is to provide a rotary chamber engine according to the foregoing object which exhibits a maximum compression ratio and hence maximum hour output and efficiency.

A further object of the invention is to provide a rotary chamber pressure fluid device of the character described wherein leakage of working fluid between adjacent chamber spaces, across the intervening rotor vane, is effectively eliminated.

A related object of the invention is to provide a rotary chamber engine according to the foregoing object wherein pre-ignition, resulting from the leakage of hot combustion gas from a chamber space under combustion or under exhaust to an adjacent chamber space under compression or during intake, is avoided.

Still a further object of the invention is to provide a rotary chamber engine of the character described having a unique cooling system and an associated supercharging action.

Yet a further object of the invention is to provide a rotary chamber pressure fluid device of the character described having a unique valve arrangement for admitting working fluid to and venting or exhausting working fluid from the chamber spaces of the device.

Other objects of the invention are concerned with providing a rotary chamber pressure fluid device and engine of the character described which are relatively simple in construction, inexpensive to manufacture, reliable in operation, require minimum servicing are relatively immune to malfunctioning, and otherwise ideally suited to their intended purposes.

Other objects, features and advantages of the present invention will become apparent to those versed in the art from a consideration of the following description, the appended claims and the accompanying drawings, wherein:

FIG. 1 is an axial section through a rotary chamber engine according to the invention;

FIG. 2 is an enlarged section taken on line 2—2 in FIG. 1;

FIG. 3 is a section taken on line 3—3 in FIG. 1;

FIG. 3a is a fragmentary section through the periphery of the rotor and housing of the rotary engine in FIG. 1 illustrating the manner in which these parts may be provided with cooling fins;

FIG. 4 is a section taken on line 4—4 in FIG. 1,

FIG. 5 is a section taken on line 5—5 of FIG. 1;

FIGS. 6a through 6h diagrammatically illustrate the operating cycle of the engine of FIG. 1;

FIG. 7 is an exploded perspective view of a rotary vane assembly embodied in the engine of FIG. 1;

FIG. 8 is an enlarged section taken on line 8—8 in FIG. 1 illustrating certain relationships of the intake and exhaust valving embodied in the engine;

FIG. 9 illustrates an alternative intake and exhaust valving arrangement which may be embodied in the engine;

FIG. 10 is a fragmentary axial section through a further modified rotary chamber engine according to the invention, illustrating an alternative placement of the engine spark plugs;

FIG. 11 is a transverse section through a modified rotary chamber engine according to the invention;

FIG. 12 is a transverse section through a modified rotary chamber engine according to the invention embodying a rotor and rotor chamber of unique geometry which results in a substantially increased compression ratio; and FIG. 13 is a section similar to FIG. 12 illustrating the rotor and housing of the engine in FIG. 12 in a subsequent position of operation.

The rotary chamber pressure fluid device or engine 10 which has been selected for illustration in FIGS. 1 through 8 of these drawings comprises a housing 12 defining an internal rotor chamber 14 and having a central axis 16. Housing 12 is mounted on a support 18 for rotation on its axis 16. Within the rotor chamber 14 is a rotor 20 including a body 22 having a central axis 24 disposed in spaced parallel relation to the housing axis 16. Rotor 20 is supported, by means 25, for rotation on its axis 24. Slidably fitted in axially extending, radially opening slots in the rotor body 12 are a number of vanes 26. Within the rotor body are means 28 for yieldably urging these vanes radially outward into fluid sealing relation with the wall of the rotor chamber 14. The adjacent rotor vanes 26 define therebetween chamber spaces 30. In a particular rotary chamber fluid pressure device or engine under consideration, the rotor vanes 26, and hence the chamber spaces 30, are three in number. The rotor vanes are uniformly circumferentially spaced 120° apart. Accordingly, the chamber spaces 30 are each 120° in circumferential extent. Operatively associated with the housing 12 and rotor 20 are means 32 for effecting rotation of the housing and rotor approximately in unison on their respective axes 16, 24, in such manner as to avoid any substantial relative angular movement between the housing and rotor.

Drivably coupled to the rotor 20 are transmission means 34 for transmitting rotary driving power between the engine and an external mechanism (not shown). In the engine under consideration, the engine drives the external mechanism through the transmission means 34. In the case of a rotary pump according to the invention, the pump rotor would be driven from an external prime mover through the power transmission means 34. Within the engine are intake and exhaust passages 36, 38, respectively, for conveying a working fluid to and from the chamber spaces 30. In the illustrated engine, this working fluid is a combustible air fuel mixture. Valve means 40 are provided for communicating the intake passage 36 and the exhaust passage 38 to the chamber spaces 30 in timed relation to rotation of the housing 12 and rotor 20. Spark plugs 42 are provided for igniting the combustible mixture in each chamber space in timed relation to rotation of the rotor and housing in such a way as to effect driving of the rotor by the pressure of the hot combustion gas on the unbalanced areas of the vanes which bound each of the chamber spaces 30.

The operating cycle of the engine is illustrated in FIGS. 6a through 6h. This operating cycle will be explained in detail presently. Suffice it to say at this point that during unified rotation of the housing 12 and rotor 20, the chamber spaces 30 undergo progressive and alternate expansion and contraction. Briefly tracing the operating cycle of the chamber space 30a in the latter figures, it will be observed that in FIG. 6b the chamber space is undergoing expansion and is receiving a combustible air-fuel mixture (hereinafter referred to simply as fuel) from the intake passage 36. In FIGS. 6c and 6d, the chamber space 30 is undergoing traction with resultant compression of the fuel in the chamber space. In FIGS. 6e and 6f, the chamber space 30a is again undergoing expansion and the fuel in the space is undergoing combustion for driving the rotor and housing in rotation. In FIGS. 6g and 6h, the chamber space 30a is again undergoing construction and the spent combustion gas in the chamber is being expelled into the exhaust passage 38.

Referring now in greater detail to the rotary chamber engine 10 illustrated in the drawings, the engine housing 12 will be observed to be generally cylindrical in transverse cross-section. This housing includes a cylindrical wall 46 closed at its ends by circular plate-like end walls 50. Each housing end wall 50 has an outwardly directed coaxial hub 52 surrounded by a number of circumferentially elongated openings 54. As shown best in FIG. 5, these openings are generally uniformly angularly spaced about the housing axis 16.

The housing support 18 includes upstanding mounting brackets 56 which straddle the housing 12 in its endwise direction. Mounting brackets 56 have inner coaxial journals 58 which fit rotatably within the hubs 52 on the housing end wall 50. The mounting brackets 56 support the engine housing 12 for rotation on its axis 16.

The body 22 of rotor 20 is cylindrical in transverse cross-section and has a diameter substantially less than the internal diameter of the cylindrical rotor chamber 14. Extending from the ends of the rotor body are integral coaxial shafts 60. These shafts extend rotatably through journal bores 62 in the housing mounting brackets 56 and support the rotor for turning on its axis 24. The end faces of the rotor body 22 have seals 63 which engage the inner faces of the housing end walls 50. As shown best in FIG. 3, the rotor body 22 is a unitary structure having an outer relatively thin walled rim portion 64, a central hub portion 66, and a number of alternately aranged and uniformly spaced spokes 68, 70 extending between the hub and rim. The spokes 68 are relatively narrow in the axial direction of the rotor body and are centered endwise between the ends of the body, as shown in FIG. 1. The width of the intervening spokes 70 is equal to the axial length of the rotor body 22. The spokes 68 and 70 are each three in number and are spaced 120° apart. The adjacent vanes 68, 70 are thus spaced 60° apart.

The rotor vanes 26 are slidably fitted in radial slot 72 cut into the rotor body spokes 70. As shown best in FIG. 1, the vane slots 72 open through opposite ends of the rotor body 22. Each rotor vane 26 comprises a pair of plates 74 disposed in face to face contact and having confronting grooves defining vent passages 76. The outer ends of the vent passes in the vanes open to grooves 78 which extend along the outer edges of the vanes. The inner edges of the vent passages open through the inner edges of the vanes. Extending through the bottoms of the vane slots 72 are passages 80 in the rotor body 22 which communicate, in the manner hereinafter explained, to the engine exhaust 38. The outer vane groves 78, therefore, communicate to the engine exhaust 38 through the vane passages 76 and the rotor body passages 80. As will appear presently, any working fluid, i.e., combustion gas, which tends to leak between adjacent chamber spaces 30 of the engine 10, past the outer edge of the intervening rotor vane 26, is bled to the engine exhaust 38 through the communicating passages just referred to. This aids in preventing preignition during operation of the engine.

The ends of the rotor vanes 26 are slotted to receive spring loaded metal seals 82. Seals 82 bear against the inner faces of the adjacent housing end walls 50. These seals, and the rotor body seals 63 referred to earlier, compensate for wear and prevent leakage of working fluid or combustion gas between adjacent chamber spaces 30 at the ends of the rotor body 22.

Within each rotor spoke 70, adjacent the ends of the corresponding rotor vane 26, are a pair of piston chambers or cylinders 84 which open outwardly through the bottom of the adjacent vane slot 72. The inner ends of these cylinders are closed. Slidable within the cylinders 84 are plungers 86 which seat against the inner edges of the adjacent rotor vanes 26. Springs 88 acting between the bottom walls of the cylinders 84 and the plungers 86 urge the latter outwardly against the rotor vanes 26 and, thereby, these vanes outwardly into fluid sealing relation with the wall of the rotor chamber 14. The inner end of each vane cylinder 84 communicates, through a passage 90 in the rotor body 22, to an adjacent chamber space 30. As will be explained presently, during operation of the engine 10, the high pressure combustion gas generated in each chamber space during combustion therein enters the adjacent vane cylinders 84 through the passages 90 and produces an outward force or thrust on the corresponding vane plungers 86 in addition to that exerted by the plunger springs 88 and centrifugal force. Accordingly, during operation of the gas engine 10, the rotor vanes 26 are subjected to outward spring, centrifugal, and combustion gas forces which urge the vanes outwardly against the wall of the rotor chamber 14.

The above-described means for venting the outer edges of the rotor vanes 26 and for urging the vanes outwardly against the wall of the rotor chamber 14 cooperate to maintain the vanes in highly efficient fluid sealing relation with the chamber wall and, thereby, to prevent leakage of working fluid or combustion gas between adjacent chamber spaces 30. Pre-ignition in the chamber spaces during operation of the engine is thus avoided.

It will be recalled that the rotary chamber engine 10 includes transmission means 32 which drivably couple the engine housing 12 and rotor 20 for turning thereof in unison and power transfer means 34 through which driving torque is transmitted from the engine to an external mechanism (not shown) to be driven. As shown best in FIGS. 2 and 4, the power transfer means 34 comprises a power output shaft 97 which is rotatably supported in one of the housing mounting brackets 56 for turning on an axis parallel to but offset slightly below the rotor axis 24. Rigid on the output shaft are a pair of gears 92 and 94. Gear 92 meshes with a gear 96 rigid on the outer end of the adjacent rotor shaft 60. Output shaft gear 94 meshes with a gear 98 coaxially fixed to the adjacent end of the housing 12. It is now evident, therefore, that turning of the engine rotor 20 is effective to drive both the engine housing 12 and the output shaft 97 in rotation. The output shaft gears 92, 94 have approximately the same diameter and the same number of teeth, as do the rotor and housing gears 96, 98. Accordingly, the housing 12 and rotor 20 turn in the same direction and at the same or approximately the same angular velocity.

The valve means 40 for communicating the engine chamber spaces 30 to the engine intake 36 and exhaust 38 comprise a rotary valve sleeve 100. This valve sleeve extends through the body 22 of the engine rotor 20 on the rotor axis 24 and rotatable relative to the body. Suitable seals (not shown) may be provided for sealing the valve sleeve to the rotor body. The ends of the valve sleeve are open and extend coaxially through and beyond the rotor shafts 60. Fixed on the end of the valve sleeve 100 adjacent the output shaft 97 is a gear 102 which meshes with a gear 104 rigid on the output shaft. Accordingly, during operation of the engine 10, the valve sleeve 100 is driven in rotation in the same direction as the housing 12 and rotor 20. However, the valve sleeve gear 102 is smaller than the rotor and housing gears 96, 98 and the output shaft gear 104 is larger than the output shaft gears 92, 94. As a consequence, the angular speed of the valve sleeve exceeds the angular speed of the engine housing 12 and rotor 20. In a typical engine according to the invention, for example, the valve sleeve turns at one and one-half times the speed of the rotor and housing. Thus, during operation of the engine 10, the rotor 20 and valve sleeve 100 undergo relative rotation.

Extending across the interior of the valve sleeve 100 at its center is a wall 106, the central portion of which is disposed in a plane containing the axis of the valve sleeve. The central valve sleeve passage at the right hand side of this wall in FIG. 1 forms an intake passage 108 which communicates to the engine intake 36. The central valve sleeve passage at the left hand side of the valve sleeve wall 106 forms an exhaust passage 110 which communicates with the engine exhaust 38. Opening through the cylindrical wall of the valve sleeve at opposite sides of its internal wall 106 are intake port 112 and an exhaust port 114. The intake port 112 communicates with the valve sleeve intake passage 108. The exhaust port 114 communicates with the valve sleeve exhaust passage 110.

It will be recalled that during operation of the engine 10, the rotor 20 and the valve sleeve 100 undergo relative rotation. During this relative rotation of the rotor and valve sleeve, the valve sleeve intake and exhaust ports 112 and 114 are successively aligned with combined intake and exhaust passages 116 in the rotor body 22. As shown best in FIGS. 1 and 3, the rotor passages 116 extend through the narrow rotor spokes 68 and open at their outer ends to the adjacent chamber spaces 30. The inner ends of the passage 116 open to the central bore through the rotor body 22 which receives the valve sleeve 100. It is evident at this point, therefore, that during operation of the engine 10, relative rotation of the rotor 20 and valve sleeve 100 is effective to alternately communicate the engine chamber spaces 30 to the engine intake 36 and the engine exhaust 38.

As shown best in FIG. 1, the wall of the valve sleeve 100 has a number of ports 118 at the exhaust side of its central internal wall 106. These ports are circumferentially spaced about the valve sleeve in a plane containing the rotor vane vent passages 80 in the rotor body 22 and open to an external groove 119 in the sleeve. It is apparent that during operation of the engine, the rotor passages 80 and valve sleeve ports 118 continuously communicate the outer vane grooves 78 to the engine exhaust 38, for the reasons stated earlier.

In the particular rotary chamber engine 10 illustrated in the drawings, the engine intake 36 comprises the central passage through a conduit 120 for conveying a combustible air fuel mixture from a carburetor 122 to the engine. The down stream end of the conduit 120 is open and is disposed in coaxial fluid sealing relation to the intake end of the valve sleeve 100, thus to permit flow of the fuel, i.e. the combustible air fuel mixture, into the valve sleeve intake passage 108. The engine exhaust 38 comprises a central passage through an engine exhaust conduit or pipe 124. This exhaust pipe has an open end communicating with the exhaust end of the engine valve sleeve 100, thus to permit exhaust gas flow from the valve sleeve to the exhaust pipe. Any conventional rotary fluid tight joints may be provided between the engine valve sleeve 100, the fuel supply conduit 120, and the exhaust conduit or pipe 124. In the drawings, for example, these parts are provided with simple beveled interfitting ends which are effective to permit rotation of the valve sleeve 100 while preventing fuel leakage at the intake end of the valve sleeve and exhaust gas leakage at the exhaust end of the valve sleeve.

The housing support 18 of the illustrated rotary chamber engine 10 comprises, in addition to the housing mounting brackets 56, a casing 126 which encloses the engine. At one end of this casing is an air inlet 128. Extending from the opposite end of the casing 126 is an air return pipe 130 for conveying air from the interior of the casing to the carburetor 122 for mixing with the combustible air fuel mixture entering the engine through the intake 36. As will appear presently, during operation of the rotary chamber engine 10, air flow occurs through the casing 126 to cool the engine. Ignition of the combustible air fuel mixture entering the engine is accomplished by spark plugs 132. These spark plugs are uniformly angularly spaced about and are threaded in the cylindrical wall 46 of the outer motor housing 12. The points of the spark plugs are exposed within the chamber spaces 30, respectively, defined by the rotor vanes 26.

It is apparent at this point that if we assume, for the moment, the rotor 20 is driven in rotation by combustion, within the chamber spaces 30, of the air fuel mixture entering the engine through the engine intake 36, the rotor turns on its axis 24. The housing 12 is driven in rotation, on its axis 16, by and in unison with the rotor through the transmission means 32. The valve sleeve is driven in rotation on the rotor axis, in timed relation, in the same direction as, but at a faster angular velocity than the rotor through the gear train 102, 104. The resultant relative rotation of the rotor and valve sleeve is effective to alternately communicate the valve sleeve intake and exhaust ports 112, 114 with the engine chamber spaces 30 in timed relation to rotation of the rotor 20, in the manner illustrated in FIGS. 6a to 6h. As a consequence, these chamber spaces are placed in alternate communication with the engine intake 36 and exhaust 38 in timed relation to rotation of the rotor, also as illustrated in FIGS. 6a through 6h.

As noted earlier and is now obvious, the chamber spaces 30 in the present rotary chamber engine 10, rotate with the engine housing 12 and rotor 20. During this rotation of the chamber spaces, the latter undergo alternate expansion and contraction. Thus, each chamber space undergoes expansion during one-half of each revolution of the rotor and housing and contraction during the remaining half of each revolution. During this eccentric rotation of the rotor and housing, the rotor vanes 26 slide in and out relative to the rotor body 22 to accommodate this expansion and contraction of the chamber spaces. However, as noted earlier and as is now obvious, little if any relative sliding movement occurs between the rotor vanes 26 and the rotor housing 12 owing to the fact that the rotor and housing turn in unison.

The operation of the rotary chamber engine 10 will now be described by reference to FIGS. 6a through 6h. In the following description of the engine operation, the operating cycle of only one engine chamber space, i.e., chamber space 30a in the latter figures, will be explained in detail since its operating cycle is typical of all of the chamber spaces. In FIGS. 6a through 6h, the successive figures represent successive 90° angles of rotation of the housing 12 and rotor 20. Thus, FIG. 6b illustrates the rotor and housing after rotation through 90° from the position of FIG. 6a. FIG. 6c illustrates the rotor and housing after rotation through 90° from the position of FIG. 6b, and so on. In the initial rotor and housing position illustrated in FIG. 6a, the chamber space 30a is contracted to its minimum volume and the valve sleeve 100 blocks all of the rotor intake-exhaust passages 116. During the first 90° of rotation of the rotor and housing to the position of FIG. 6b, the chamber space 30a undergoes expansion and the valve sleeve 100 rotates forwardly relative to the rotor 20, that is forwardly in the direction of rotation of the rotor, to place the valve sleeve intake port 112 in communication with the rotor passage 116a leading to the chamber space 30a. Accordingly, during rotation of the rotor and housing from the position of FIG. 6a to the position of FIG. 6b, combustible mixture from the carburetor 122 enters the expanding chamber space 30a.

During the next 90° of rotation of the housing 12 and rotor 20 from the position of FIG. 6b to the position of FIG. 6c, the chamber space 30a undergoes continued expansion to its maximum volume condition of FIG. 6c. The chamber space continues to receive combustible mixture from the carburetor 122 until forward rotation of the valve sleeve 100 relative to the rotor 20 results in reclosing of the rotor passage 116a leading to the chamber space 30a, as in FIG. 6c.

During the next 180° of rotation of the rotor housing 12 and rotor 20 from the position of FIG. 6c, through the position of FIG. 6d, to the position of FIG. 6e, the chamber space 30a undergoes contraction to its minimum volume condition of FIG. 6e. The rotor passage 116 leading to the chamber space continues to be blocked by the valve sleeve 100. Accordingly, the combustible mixture within the chamber space is compressed.

At or slightly beyond the position of FIG. 6e, at which the combustible mixture in the chamber space 30a has been compressed to its minimum volume, the spark plug 132 associated with the chamber space is energized to ignite the mixture. The manner in which the spark plugs are energized or fired in timed relation to rotation of the rotor and housing will be explained presently. Ignition and resultant combustion of the compressed combustible mixture in the currently contracted chamber space 30a generates high pressure combustion gas in this space. Such ignition and combustion is initiated when the leading vane bounding the chamber space 30a has greater exposed surface area than the trailing vane. The reaction of the high pressure combustion gas against the unbalanced areas of the rotor vanes bounding the chamber space 30a, therefore, produce a resultant or net torque on the rotor 20 for driving the latter in the direction of rotation indicated in FIG. 6a through 6h. This driving torque continues to be exerted on the rotor from the position of FIG. 6e at which ignition occurs, through the position of FIG. 6f, to the position of FIG. 6g. During rotation of the housing 12 and rotor from the position of FIG. 6e to the position of FIG. 6g, the chamber space 30a undergoes re-expansion from its minimum volume condition to its maximum volume condition. It will be observed that the valve sleeve 100 continues to block the rotor passage 116a leading to the chamber space 30a, whereby the combustion gas remains trapped in the chamber space and, therefore, continues to react on the rotor vanes 26 for producing a continued driving torque on the rotor, as just stated.

During the next 180° of rotation of the housing 12 and rotor 20 from the position of FIG. 6g, through the position of FIG. 6h, to the initial position of FIG. 6a, the chamber space 30a again undergoes contraction from its maximum volume condition to its minimum volume condition. The forward relative rotation of the valve sleeve 100 with respect to the rotor 20 aligns the exhaust port 114 in the valve sleeve with the rotor passage 116a leading to the chamber space 30a. Accordingly, contraction of the chamber space 30a occasioned by rotation of the housing and rotor from the position of FIG. 6e to the position of FIG. 6a expells the spent combustion gas from the chamber space, through the exhaust port 114, to the engine exhaust 38 to complete one operating cycle of the chamber space 30a. The chamber space 30a undergoes the same operating cycle during each two successive revolutions of the housing 12 and rotor 20. As noted earlier, the operating cycle described above is typical of all of the chamber spaces of the rotary chamber engine 10, except, of course, that they occur sequentially according to the firing order of the engine. Assuming the engine spark plugs 132 are successively numbered 1, 2 and 3 counter-clockwise direction and assuming clockwise rotation of the housing 12 and rotor 20, the preferred firing order of the engine, i.e., of the spark plugs, is 1, 3, 2, 1, 3, 2 . . .

FIG. 8 illustrates, in enlarged detail, the arrangement of the intake and exhaust valving of the engine for attaining the engine operation described above. In this figure, it will be observed that each of the intake and exhaust ports 112, 114 in the valve sleeve have an angular extent of 45° circumferentially of the valve sleeve. The centers of the ports are spaced 90° apart. Accordingly, the land between the ports has an angular extent, circumferentially of the valve sleeve, 45°. The cross-sectional dimension of each of the rotor intake-exhaust passages 116, measured in a circumferential direction of the valve sleeve, is equal to the corresponding circumferential dimension of the valve sleeve ports 112, 114 and the intervening land. As noted earlier, the valve sleeve is driven at one and one-half times the velocity of the engine housing 12 and rotor 20. Accordingly, during the operating cycle described above, the valve sleeve undergoes three revolutions in moving through the positions shown in FIGS. 6a through 6h and back to 6a. It is apparent that the above dimentional and velocity relationships between the rotor 20 and valve sleeve 100 enable the present engine to accomplish the described operating cycle for each of its chamber spaces 30.

It is significant to note at this point that the illustrated rotary chamber engine 10 is a four cycle engine wherein the operating cycle of each of the chamber spaces 30 include four successively occuring cycle phases, to wit, an intake phase, a compression phase, a power phase, and an exhaust phase. The operating phases of the several chamber spaces are timed in such a way as to produce, on the rotor 20, a relatively smooth and continuous unidirectional driving torque.

It will be recalled that the chamber spaces 30 communicate, via the passages 90 in the rotor body 22, to the inner ends of the chambers or cylinders 84 in the rotor body 22 which contain the rotor vane biasing plungers 86 and plunger springs 88. When combustion occurs in each of the engine chamber spaces 30, the high pressure combustion gas generated in the chamber reacts outwardly on the adjacent rotor vanes 26, thereby urging the vanes upwardly into fluid sealing relation with the wall of the rotor chamber 14. It will be further recalled that the grooves 78 in the outer edges of the rotor vanes communicate, via the passages 80 in the rotor body 22 and the valve sleeve ports 118, to the engine exhaust 38. The combined spring, centrifugal and gas forces active on the rotor vanes 26 during operation of the engine 10 is effective to urge the outer edges of the vanes into highly efficient fluid sealing relation with the surrounding wall of the rotor chamber 14, thereby to minimize leakage of combustion gas across the vanes between a chamber space 30 under combustion and an adjacent chamber space containing combustible mixture under pressure. Any combustion gas which does tend to thus leak across a rotor vane is immediately vented to the engine exhaust. Accordingly, it is virtually impossible for leakage of combustion gas to occur between two adjacent chamber spaces 30, whereby the possibility of pre-ignition of the compressed combustible mixture in one chamber space by hot combustion gas from an adjacent chamber space under combustion is virtually eliminated. This prevention of pre-ignition in the present rotary chamber engine consitutes a highly important feature of the invention. The lack of sliding contact between the rotor vanes 26 and the wall of the rotor chamber 14 constitutes a second highly important feature of the invention which, obviously, results in a substantial reduction in wear and friction loss in the engine.

In the present rotary chamber engine 10, the spaces between the adjacent rotor spokes 68, 70 communicate with the openings 54 in the housing end walls or plates 50 to define axial passages through the engine through which a coolant, such as air, may be circulated for cooling the engine. In FIG. 1, for example, communication of the interior of the engine casing 126 to the engine intake 36, via the conduit 130, induces a continuous flow of air into the casing through its inlet 128. The incoming air flows through the engine cooling passages and then through the conduit 130 and the carburetor 122 to the engine intake 36. During its passage through the engine, the air cools the engine and, in turn, is heated. If improved air cooling of the engine is required, the engine housing and rotor may be equipped with cooling fins 134, as illustrated in FIG. 3a. If desired, the cooling fins may be angled or pitched, as shown, to induce high velocity air flow through the engine and casing 126 into the engine intake, thus to produce an effective super-charging action.

FIG. 9 illustrates alternative intake and exhaust valve means which may be employed in the engine in lieu of the valve sleeve 100 of the engine described above. The engine shown in FIG. 9 is identical in most respects to the engine described earlier and, for this reason, only the difference in the engine of FIG. 9 will be described. With this in mind, the rotor 200 comprises a body 202 which is identical to the engine rotor described earlier except that the common radial intake-exhaust passages 116 of the latter rotor are replaced, in the rotor 200, by separate radial intake passages 204 and exhaust passages 206. A wall 208 extends across the central opening through the rotor body between the intake passages 204 and the exhaust passages 206 to divide the central opening into a central intake passage 210 and a central exhaust passage 212. The radial intake passages 204 open, at their inner ends, to the central intake passage 210 and at their outer ends through the outer circumference of the rotor. The radial exhaust passages 206 open, at their inner ends, to the central exhaust passage 212 and at their outer ends through the outer circumference of the rotor. Extending axially through the rotor body 202, in intersecting relation to the pairs of radial intake and exhaust ports 204, 206, respectively, are rotary valves 214. Each rotary valve has an intake port 216 and an exhaust port 218 and is rotatable to align its intake port with the corresponding radial intake passage 204 and its exhaust port with the corresponding radial exhaust passage 206. The ports in each valve are disposed at right angles to one another so that the radial intake and exhaust passages 204, 206 in the rotor 200 are alternately opened and closed by rotation of the valves 214.

The valves extend axially beyond one end of the rotor and through the openings 216 in the adjacent end of the engine housing 218. Fixed to the extending end of each valve 214 is a gear 220. The valve gears 220 mesh with a central gear 222 which is fixed to the adjacent rotor housing mounting bracket 224. The engine of FIG. 9 is otherwise identical to the engine described earlier.

It is obvious from the foregoing description that during operation of the rotary chamber engine of FIG. 9, the valves 214 rotate in timed relation to rotation of the rotor 200 and its housing 218. During this rotation of the valves, the latter alternately communicate the engine chamber spaces to the engine intake and exhaust, thus to admit combustible mixture to and vent spent combustion gas from the chamber spaces. The rotary valves are relatively oriented and timed in such a way as to provide their respective chamber spaces with the same operating cycle as described earlier in connection with FIGS. 1 through 8.

FIG. 10 illustrates a modified spark plug placement which may be utilized in the rotary chamber engine of FIGS. 1 through 8. In this case, the spark plug 132 for each chamber space is threaded into the rotor spoke 68 which contains the combined intake-exhaust passage 116 leading to the respective chamber space. The points of the spark plugs are exposed to the interior of the passages. The spark plug leads extend through the adjacent rotor shaft 60 to the exterior of the rotor housing 12 for connection to a distributor (not shown).

It is apparent that since the rotor and rotor housing of the present rotary chamber engine do not undergo relative rotation, it is unnecessary for the rotor and/or the rotor chamber to be circular in transverse cross-section, as they must in conventional rotary engines. FIG. 11, for example, illustrates one possible non-circular rotor chamber configuration which may be employed in the present rotary chamber engine. In this case, the inner surface of the rotor housing 300, which defines the outer wall of the rotor chamber 302, has a number of arcuate, axially extending recesses or scallops 304 uniformly circumferentially spaced thereabout. These scallops have equal radii of curvature which is the same as the external radius of the body 306 of the engine rotor 308. The rotor housing scallops 304 are equal in number to the chamber spaces 310 defined by the rotor vanes 312 and are located between the vanes so as to form the outer walls of these chamber spaces.

As illustrated in the upper portion of FIG. 11, in the minimum volume condition of each chamber space 310, the body 306 of the rotor 308 seats within the corresponding scallop 304 in the rotor housing 300, thus to provide the respective chamber space with substantially zero, or at least absolutely minimal, volume. This is in contrast to the rotary chamber engine illustrated in FIGS. 1 through 8, for example, wherein it will be observed that in its minimum volume condition, each chamber space 30 has an appreciable volume, owing to the difference between the internal radius of the rotor housing 12 and the external radius of the rotor body 20. The engine configuration of FIGS. 1 through 8, therefore, is inferior to that illustrated in FIG. 11 for the reason that the latter engine configuration permits a substantially higher compression ratio and, therefore, substantially greater power output and higher engine efficiency.

FIGS. 12 and 13 illustrate an alternative non-circular rotor and rotor housing configuration according to the invention. In this case, the body 402 of the engine rotor 400 and the rotor housing 404 are generally triangular in transverse cross-section. Here again, this non-circular or triangular configuration of the rotor and rotor body is permitted by the fact that the rotor and rotor housing do not undergo relative rotation. However, to permit some degree of freedom of relative rotation between the rotor and housing, and thus avoid excess strain in the engine parts, the rotor housing 404 may be provided with cylindrically curved seating surfaces 406 within its apices for seating engagement by the rotor vanes 408. The circumferential dimensions of the seating surfaces 406 is somewhat greater than the thickness of the rotor vanes 408 to provide limited freedom of relative angular movement between the rotor and rotor housing. Thus, the vanes will slide back and forth along the seating surfaces once per revolution and through a distance equal to the spacing between the rotor and housing axes.

As shown in the upper portion of FIG. 12, this triangular rotor and rotor housing configuration permits each side of the rotor body 402 to seat flat against the opposing side of the rotor housing 404, in the minimum volume condition of the corresponding chamber space 410 of the engine, thus to provide each chamber space with substantially zero volume in its minimum volume condition. Accordingly, the engine configuration of FIGS. 12 and 13 achieves the same desirable high compression ratio as the engine configuration of FIG. 11. Obviously, other non-circular engine configurations are possible. It is evident, of course, that the exact shape of any non-circular engine configuration is dictated, in part, by the number of rotor vanes, and hence chamber spaces, in the engine. For example, the triangular engine configuration of FIGS. 12 and 13 is limited to a rotor with three vanes. The scalloped engine configuration of FIG. 11, on the other hand, may be employed in engines having rotors with various numbers of rotor vanes, defining a corresponding number of chamber spaces. Engines with more than three chambers may have flat walled chambers similar to those shown in FIGS. 12 and 13.

In this latter regard, attention is directed to the fact that the rotor 308 of the rotary chamber engine illustrated in FIG. 11 has five vanes 312 defining five chamber spaces 310, in contrast to the three vanes and three chamber spaces of the rotary chamber engine illustrated in FIGS. 1 through 8 and FIGS. 12, 13. The engine of FIG. 11, of course, would be provided with an equal number of spark plugs (not shown) for igniting the combustible mixtures within the chamber spaces 320 during the power portions or strokes of their respective operating cycles. Increasing the number of chamber spaces, obviously, increases the number of power or torque impulses which are exerted on the rotor during each revolution and, as a result, the smoothness of the engine operation. Accordingly, the maximum number of chamber spaces is desirable in most cases in the interest of optimum engine operation. In the case of the engine of FIG. 11, the preferred firing order of the engine spark plugs is 1, 3, 5, 2, 4, assuming that these plugs are consecutively numbered in the counter-clockwise direction and clockwise rotation of the rotor and rotor housing.

The rotary chamber engine of FIG. 11, obviously, may embody the intake-exhaust valving illustrated either in FIGS. 1 through 8 or in FIG. 9. However, the engine illustrated in FIG. 11 has been shown to comprise the separate rotary valve arrangement of FIG. 9.

The spark plugs of the present rotary chamber engine may be energized or fired by various distributor means. When the plugs are mounted on the housing, as in the engine of FIGS. 1 through 8, for example, a contact 500 may be mounted on the outer engine casing 126 in a position to engage a mating contact 502 on each plug at the proper point in the cycle of the corresponding chamber space, thus to fire the plug. In this case, each spark plug will fire once during the power phase and once again during the exhaust phase of its respective chamber space. This may be desirable to ignite any unburned fuel and thereby purify the exhaust gas. Alternatively, if the spark plugs are mounted on the rotor, as in FIG. 10, an external distributor is required to fire the plugs, as stated earlier.

It is now apparent that the invention disclosed herein achieves all of the objects and advantages set forth earlier, to wit, absence of, or at least minimal, relative rotation between the rotor and housing, minimal friction loss and wear, minimal dynamic unbalance, maximum compression ratio, simplicity of construction, economy of manufacture, and reliability of operation. As noted earlier, while the invention has been disclosed in connection with a rotary, or more particularly a rotary chamber, internal combustion engine, the features of the invention obviously may be embodied in other rotary pressure fluid devices including pumps and fluid pressure operated motors. In this connection, attention is directed to the fact that the disclosed rotary chamber engine of the invention may be powered by high pressure combustion gas generated in a combustion process occurring in combustion chamber external to the engine.

Although specific embodiments of the present invention have been illustrated and described herein, it will be understtod that the same are merely exemplary of presently preferred embodiments capable of attaining the objects and advantages hereinbefore mentioned, and that the invention is not limited thereto; variations will be readily apparent to those versed in the art, and the invention is entitled to the broadest interpretation within the terms of the appended claims.

I claim:

1. A rotary chamber fluid pressure device comprising:
   a housing defining an internal rotor chamber having a central axis, a housing support mounting said housing for rotation on said axis, a rotor within said chamber including a body having a central axis disposed in spaced parallel relation to said housing axis, a number of angularly spaced radially movable vanes carried by said body, and yieldable means urging said vanes outwardly relative to said body, said rotor having intake and exhaust passages, means supporting said rotor in said housing for rotation of said rotor on its central axis relative to said housing, said yieldable means urging said vanes outwardly into fluid sealing relation with the wall of said chamber, whereby the adjacent vanes define therebetween chamber spaces, means for effecting rotation of said housing and rotor approximately in unison on their respective central axes in such manner as to effect cyclic contraction and expansion of said chamber spaces without any substantial relative angular movement between said rotor and housing, valve means for admitting a working fluid to and exhausting said working fluid from said chamber spaces through said passages, respectively, in timed relation to unified rotation of said rotor and housing, and power transmission means drivably coupled to said rotor for transmitting rotary driving power between said rotor and an external mechanism.

2. A pressure fluid device according to claim 1 wherein: said means for effecting unified rotation of said housing and said rotor comprises rotary power transmission means drivably coupling said housing and rotor.

3. A rotary pressure fluid device according to claim 1 wherein:
said rotor and rotor chamber are non-circular in transverse cross-section and have confronting surfaces defining the inner and outer walls of said chamber spaces, respectively, and
the respective confronting surfaces being disposed in virtual contact over their entire area when the intervening chamber space is in its minimum volume condition, thereby to provide said device with a maximum compression ratio.

4. A fluid pressure device according to claim 1 wherein:
said rotor body has a generally cylindrical outer surface, and
the wall of said rotor chamber has a number of axially extending generally uniformly spaced arcuate scallops defining the outer walls of said chamber spaces, respectively, and having equal radii of curvature closely approximately the external radius of said rotor body.

5. A pressure fluid device according to claim 1 wherein: said rotor body and rotor chamber are generally polygonal in transverse cross-section and have generally parallel confronting wall surfaces extending between said rotor vanes, respectively, and defining the inner and outer sides of said chamber spaces, respectively.

6. A pressure fluid device according to claim 1 wherein:
said device comprises a motor to be operated by said working fluid, and
said power transmission means comprises a shaft for drivably coupling said rotor to an external mechanism to be driven.

7. A pressure fluid device according to claim 1 wherein:
said device comprises an internal combustion engine,
said working fluid comprises a combustible mixture which is compressed in said chamber spaces during contraction of said spaces, and
ignition means on said engine for igniting the compressed combustible mixture in each chamber space in timed relation to unified rotation of said rotor and housing.

8. An engine according to claim 7 wherein: said ignition means comprise spark plugs carried by said housing.

9. A pressure fluid device according to claim 1 wherein:
said device comprises an internal combustion engine,
said working fluid comprises a combustible mixture which is compressed in said chamber spaces during contraction of said spaces, and
spark plugs carried by said rotor for igniting the compressed combustible mixture in each chamber space in timed relation to unified rotation of said rotor and housing.

10. A pressure fluid device according to claim 1 wherein:
said device comprises a four cycle internal combustion engine,
said working fluid comprises a combustible mixture,
said valve means comprise intake and exhaust valve means for providing each said chamber space with an operating cycle including an intake phase during which the respective chamber space undergoes expansion while in communication with said intake passage to induce flow of said mixture into the respective chamber space, a compression phase during which the respective chamber space undergoes contraction while isolated from said intake and exhaust passages to effect compression of the combustible mixture in the respective chamber space, a power phase during which the respective chamber space undergoes expansion while isolated from said intake and exhaust passages and the compressed combustible mixture within the respective chamber space is burned to produce a driving torque on said rotor, and an exhaust phase during which the respective chamber space undergoes contraction while in communication with said exhaust passage to effect expulsion of the spent combustion gas from the respective chamber space, and
ignition means on said engine for igniting the compressed combustible mixture in each said chamber space in timed relation to unified rotation of said rotor and housing in such manner as to effect burning of said mixture in said chamber spaces during the power phase of their respective operating cycles.

11. An engine according to claim 10 wherein: said means for effecting unified rotation of said housing and rotor comprises rotary power transmission means drivably coupling said rotor and housing.

12. A pressure fluid device according to claim 1 wherein:
said device comprises an internal combustion engine,
said working fluid comprises a combustible mixture which is compressed in said chamber spaces during contraction of said spaces,
ignition means on said engine for igniting the compressed combustible mixture in each chamber space in timed relation to unified rotation of said rotor and housing, and
said housing and rotor having communicating passages extending axially therethrough through which a coolant may be circulated to cool said engine.

13. An engine according to claim 12 including:
a casing enclosing said housing,
said casing having an inlet adjacent one end of said housing through which are may enter said casing,
means communicating the interior of said casing adjacent the other end of said housing to said engine intake passage, and
cooling fins on said rotor and housing for aiding heat transfer from said engine to said air and inducing air flow through said engine.

14. In a rotary pressure fluid device characterized by a housing defining an internal rotor chamber having a central axis, a rotor positioned in said chamber and having a central axis disposed in spaced parallel relation to said housing axis, means supporting said rotor in said chamber for turning on the central axis of the rotor, circumferentially spaced radially movable vanes carried by said rotor and disposed in sealing relation to the wall of said chamber, the adjacent vanes defining therebetween chamber spaces, and means for admitting a working fluid to and venting the working fluid from said chamber spaces, respectively, in timed relation to rotation of said rotor, the improvements comprising:

fluid pressure actuated means in said rotor operatively associated with the said rotor vanes, respectively for urging said vanes outwardly into fluid sealing relation with the wall of said rotor chamber, passage means communicating said fluid pressure actuated means to said chamber spaces, respectively, to permit flow of pressure fluid from said chamber spaces to said pressure actuated means, each said rotor vane having a groove in its outer chamber wall engaging edge, and passage means communicating said vane grooves to a reduced pressure region.

15. In a rotary pressure fluid device characterized by a housing defining an internal rotor chamber having a central axis, a rotor positioned in said chamber and having a central axis disposed in spaced parallel relation to said housing axis, means supporting said rotor in said chamber for turning on the central axis of the rotor, circumferentially spaced radially movable vanes carried by said rotor and disposed in sealing relation to the wall of said chamber, the adjacent vanes defining therebetween chamber spaces, and means for admitting a working fluid to and venting the working fluid from said chamber spaces, respectively, in timed relation to rotation of said rotor, the improvements comprising:

grooves extending along the outer chamber wall engaging edges of said rotor vanes, respectively, and passage means communicating said vane grooves to a reduced pressure region.

16. A pressure fluid device according to claim 1 including:

fluid pressure actuated means for urging said rotor vanes outwardly in fluid sealing relation with the wall of said rotor chamber in response to the fluid pressure in the respective adjacent chamber spaces, and means for venting the region between the outer edge of each said rotor vane and said chamber wall to atmosphere.

17. A pressure fluid device according to claim 1 wherein:

said device comprises an internal combustion engine, said working fluid comprises a combustible mixture which is compressed in said chamber spaces during contraction of said spaces, spark plugs carried by said rotor for igniting the compressed combustible mixture in each chamber space in timed relation to unified rotation of said rotor and housing, said plugs extending radially from said rotor and having electrical contact means at their outer ends, and plug ignition means including electrical contact means on said housing periodically engageable with said plug contacts, respectively, during unified rotation of said rotor and housing.

References Cited

UNITED STATES PATENTS

| | | | |
|---|---|---|---|
| 1,016,764 | 2/1912 | Noyes | 123—16 |
| 2,089,593 | 8/1937 | Bailey | 230—140 |
| 2,174,664 | 10/1939 | Korany | 123—16 |

CARLTON R. CROYLE, Primary Examiner

DOUGLAS HART, Assistant Examiner